United States Patent
Rowell

(10) Patent No.: US 6,907,974 B2
(45) Date of Patent: Jun. 21, 2005

(54) HIGH PERFORMANCE INTERMEDIATE SERVO ASSEMBLY

(75) Inventor: Brian G. Rowell, Saxtons River, VT (US)

(73) Assignee: Sonnax Industries, Inc., Bellows Falls, VT (US)

( * ) Notice: Subject to any disclaimer, the term of this patent is extended or adjusted under 35 U.S.C. 154(b) by 0 days.

(21) Appl. No.: 10/408,054

(22) Filed: Apr. 4, 2003

(65) Prior Publication Data

US 2003/0190988 A1 Oct. 9, 2003

Related U.S. Application Data

(60) Provisional application No. 60/369,520, filed on Apr. 4, 2002.

(51) Int. Cl.[7] .............................................. F16D 65/32
(52) U.S. Cl. ............... 192/85 R; 188/77 W; 188/151 R
(58) Field of Search .................... 192/85 R, 85 C, 192/221, 109 F; 188/77 R, 77 W, 151 R; 475/146; 92/51–53, 61–65

(56) References Cited

U.S. PATENT DOCUMENTS

| | | | | |
|---|---|---|---|---|
| 3,347,556 A | * | 10/1967 | Fleckenstein ............... 277/566 |
| 4,388,986 A | | 6/1983 | Umezawa ................. 188/77 R |
| 4,601,233 A | | 7/1986 | Sugano ........................... 92/52 |
| 4,628,795 A | * | 12/1986 | Pickard et al. ............. 92/13.41 |
| 4,787,494 A | | 11/1988 | Ogasawara et al. ........... 192/86 |
| 4,930,373 A | * | 6/1990 | Nakawaki et al. .......... 475/128 |
| 5,253,549 A | * | 10/1993 | Younger ...................... 475/146 |
| 5,944,627 A | | 8/1999 | Darling-Owen et al. .... 475/146 |
| 6,050,384 A | * | 4/2000 | Hammond ................... 192/221 |

OTHER PUBLICATIONS

"The Superior 200–4R Super Servo Instruction Sheet," copyright date 2000, Shift Technology Products, Division of Superior Transmission Parts, Inc., 3770 Hartsfield Road, Tallahassee, FL 32303.

* cited by examiner

Primary Examiner—Richard M. Lorence
(74) Attorney, Agent, or Firm—Clifford F. Rey

(57) ABSTRACT

A high performance intermediate servo assembly wherein the servo piston has been modified to provide at least a 17% increase in surface apply area and a corresponding increase in hydraulic pressure delivered to the $2^{nd}$ gear clutch band which it actuates is disclosed. The present servo piston is reconfigured to an overall length equivalent to the assembled stack-up dimensions of the original equipment servo piston, accumulator, accumulator spring, and spring retainer components and integrates the critical working surfaces thereof to retain proper function. Such original equipment components have been eliminated to simplify the intermediate servo assembly operation since shift feel is not a concern in this application. Further, the standard O-ring seals on the original equipment servo piston are replaced by high performance seals such as quad-lobed seals to ensure the hydraulic integrity of the present intermediate servo assembly under the increased fluid pressure generated.

12 Claims, 5 Drawing Sheets

HIGH PERFORMANCE INTERMEDIATE SERVO ASSEMBLY

CROSS-REFERENCE TO RELATED APPLICATION

This application claims the benefit under 35 U.S.C. § 119(e) of U.S. Provisional Patent Application No. 60/369,520 filed Apr. 4, 2002, entitled High Performance Intermediate Servo Assembly.

BACKGROUND OF INVENTION

The present invention relates to the field of automatic transmissions and, more particularly, to a high performance intermediate servo assembly for use in General Motors 200 4R transmissions (hereinafter "GM transmissions").

Automatic transmission systems of the prior art have a hydraulic circuit sub-system which includes at least a hydraulic pump, a valve body having fluid conducting passages or circuits, input and exhaust ports formed within the fluid circuits, and a plurality of valves comprised of generally cylindrical pistons having control lands formed thereon, which alternately open and close the ports to the fluid circuits to regulate the flow and pressure of automatic transmission fluid (hereinafter "ATF") to hydraulically actuate various components of the transmission. It will be understood that in describing hydraulic circuits, ATF usually changes names when it passes through an orifice or control valve in a specific fluid circuit.

In the GM transmissions the intermediate servo assembly is applied in $2^{nd}$ gear and is used as an accumulator in $3^{rd}$ gear. An accumulator is a spring-loaded device that absorbs a certain amount of apply fluid pressure to cushion the application of a clutch band against fluid shock to control shift feel and to prevent damage to these components.

In high performance applications it is desirable to increase the hydraulic fluid capacity and fluid pressure generated by the intermediate servo assembly to increase the holding capacity of the clutch band under high load conditions.

There are known prior art patents in the field and their discussion follows. U.S. Pat. No. 4,601,233 to Sugano discloses a hydraulic servo device with a built-in accumulator comprising a servo piston fit in a servo cylinder and connected via a stem to a band brake, an accumulator piston, and an accumulator piston spring biases the accumulator piston toward the servo piston. A servo release pressure acts on a pressure acting area, a servo apply pressure acts on a pressure acting area, and an accumulator pressure acts on a pressure acting area in the operation thereof.

Another example of this type of servo is shown in U.S. Pat. No. 4,787,494 to Ogasawara et al., which discloses a hydraulic operating unit for a friction-engaging band of a transmission that permits the introduction of a low-pressure working fluid to allow forcible disengagement of the hydraulic operation unit to work against the fluid, which would normally urge the unit into engagement.

U.S. Pat. No. 4,388,986 to Umezawa discloses a speed change control for an automatic transmission having a planetary gear mechanism and a brake band for altering the transmission ratio. The system comprises a servo-piston, a piston rod secured to the servo-piston and to the brake band, and an accumulator piston axially slidably disposed in the bore of the servo-piston.

U.S. Pat. No. 5,944,627 to Darling-Owen and also owned by the applicant discloses a replacement servo mechanism for applying a band in an automatic transmission wherein the servo assembly includes two servo piston members, a major piston member and a minor piston member, to which an apply pin is connected.

It is also known in the prior art to adapt the original equipment manufacture (hereinafter "OEM") intermediate servo for high performance applications by providing an aftermarket intermediate servo kit. A commercially available kit of the type marketed by Shift Technology Products, a division of Superior Transmission Parts, Inc., Tallahassee, Fla., has been designed for this purpose (FIG. 3) and is described hereinafter in further detail. For the high performance application, the user of this prior art kit is instructed by the manufacturer to disable the function of the integrated accumulator. All of the remaining OEM components are effectively used as spacers in reassembly. However, reassembly of the intermediate servo in such a manner creates mismatched part surfaces causing inaccurate operation and the potential for noise and abnormal wear.

While these devices fulfill their respective, particular objectives and requirements, the aforementioned patents do not disclose the high performance intermediate servo assembly of the present invention, which substantially departs from the conventional concepts and designs of the prior art.

SUMMARY OF THE INVENTION

Accordingly, the present invention is a high performance intermediate servo assembly wherein the servo piston has been modified to provide at least a 17% increase in surface apply area and a corresponding increase in hydraulic fluid delivered to the $2^{nd}$ gear clutch band, which it actuates to obtain $2^{nd}$ gear. This is accomplished by increasing the diameter of the servo piston and its mating cover while maintaining its overall dimensions to fit the OEM transmission case.

In addition, the present servo piston is reconfigured to an overall length equivalent to the assembled stack-up dimensions of the original equipment servo piston, accumulator, accumulator spring, and spring retainer components and integrates the critical working surfaces (i.e. spring seat, axial travel stop) thereof to retain proper function. Such original equipment components have been eliminated to simplify the intermediate servo piston's operation since shift feel is not a particular concern in this high performance application. Further, the O-ring seals on the OEM servo piston are replaced by high performance seals such as quad-lobed seals to ensure the hydraulic integrity of the intermediate servo under the increased fluid pressure generated by the present high performance servo piston.

There has thus been outlined, rather broadly, the important features of the present invention in order that the detailed description thereof that follows may be better understood, and in order that the present contribution to the art may be better appreciated. There are additional features of the invention that will be described hereinafter and which will form the subject matter of the claims appended hereto.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENTS

Figure 1:
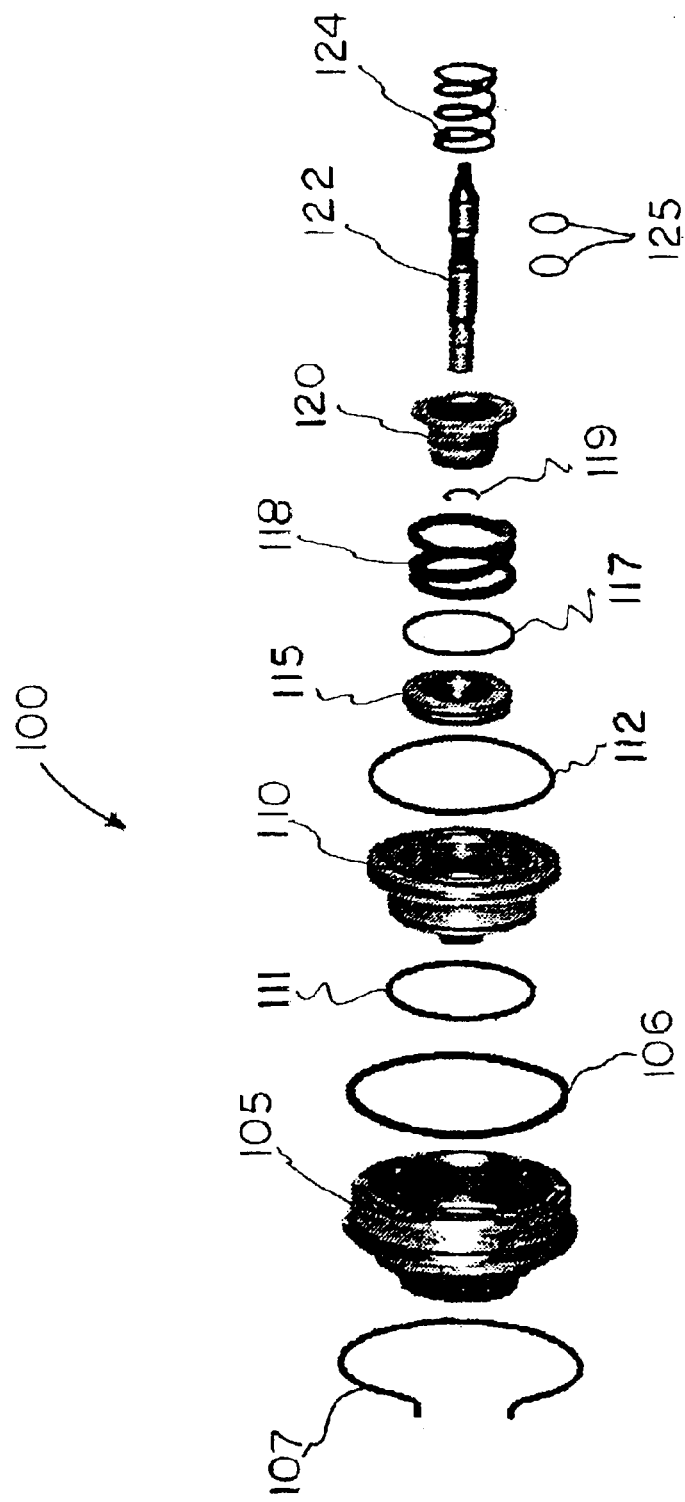
FIG. 1 is an exploded view of an intermediate servo for the GM transmissions labeled Prior Art.

Prior to describing the present invention in detail it may be beneficial to briefly review the structure and function of an intermediate servo assembly of the GM transmissions. With reference to FIG. 1 there is shown an exploded view of the OEM intermediate servo assembly, indicated generally at 100. The OEM servo assembly 100 is comprised of a servo cover 105, O-ring 106, retaining ring 107, piston 110, inner lip seal 111, outer lip seal 112, accumulator piston 115, Teflon seal 117, accumulator spring 118, retaining clip 119, spring retainer 120, band apply pin 122, cushion spring 124, and O-rings 125 arranged coaxially for installation in the transmission case 135 (FIG. 2).

Figure 2:
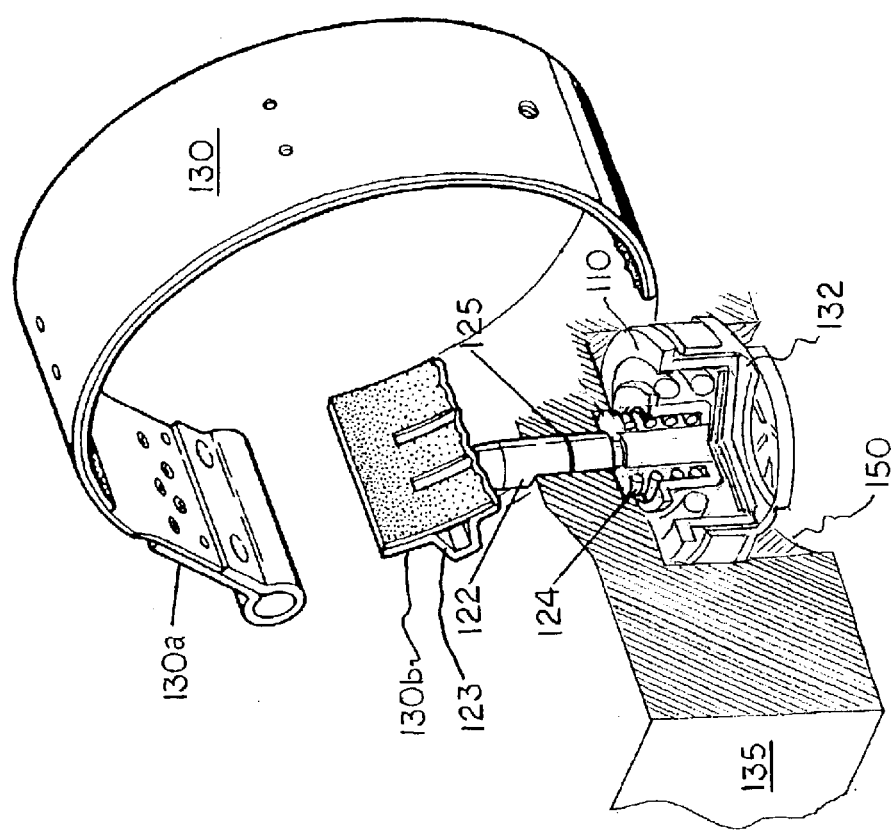
FIG. 2 is a perspective view of an intermediate servo assembly shown in its functional position engaging a clutch band labeled Prior Art.

The OEM intermediate servo assembly 100 functions to apply the intermediate clutch band 130 in $2^{nd}$ gear as shown in FIG. 2 and is used as an accumulator in $3^{rd}$ gear. An accumulator is a spring-loaded device that absorbs a certain amount of apply fluid pressure to cushion the application of a clutch band against fluid shock and also improves shift feel.

In $2^{nd}$ gear the intermediate band 130 is applied by servo 100. The intermediate band 130 is compressed around the direct clutch drum (not shown) with its distal end 130a mechanically anchored to the transmission case 135. The other end of the intermediate band 130 is hydraulically actuated by the intermediate servo 100. When the intermediate band 130 is applied, the rotation of the direct clutch drum (not shown) is prevented, which places the transaxle in $2^{nd}$ gear.

In $2^{nd}$ gear the servo piston 110 is actuated by $2^{nd}$ gear clutch fluid pressure at 132 which is delivered via an oil passage 27 (FIG. 4) in the apply pin 122 and acts on the apply side of piston 110. The apply rate of the intermediate band 130 is controlled by the $2^{nd}$ gear fluid compressing the cushion spring 124. By applying the servo piston 110 the band apply pin 122 is forced into the band 130. Thus, the band 130 is compressed around the direct clutch housing or drum (not shown) until the drum is held stationary to obtain $2^{nd}$ gear.

The OEM intermediate servo 100 releases in $3^{rd}$ gear by channeling $3^{rd}$ clutch fluid to the $3^{rd}$ accumulator exhaust valve (not shown). The force of the cushion spring 124 and the $3^{rd}$ gear clutch fluid will overcome the pressure of the $2^{nd}$ gear clutch fluid and move the piston 110 to release the band 130. The return stroke of the servo piston 110 to release the band 130 acts as an accumulator for $3^{rd}$ gear by absorbing some $3^{rd}$ gear clutch fluid. This allows the band 130 to release and the direct clutch to apply at a controlled rate for a smooth 2–3 shift.

Figure 3:
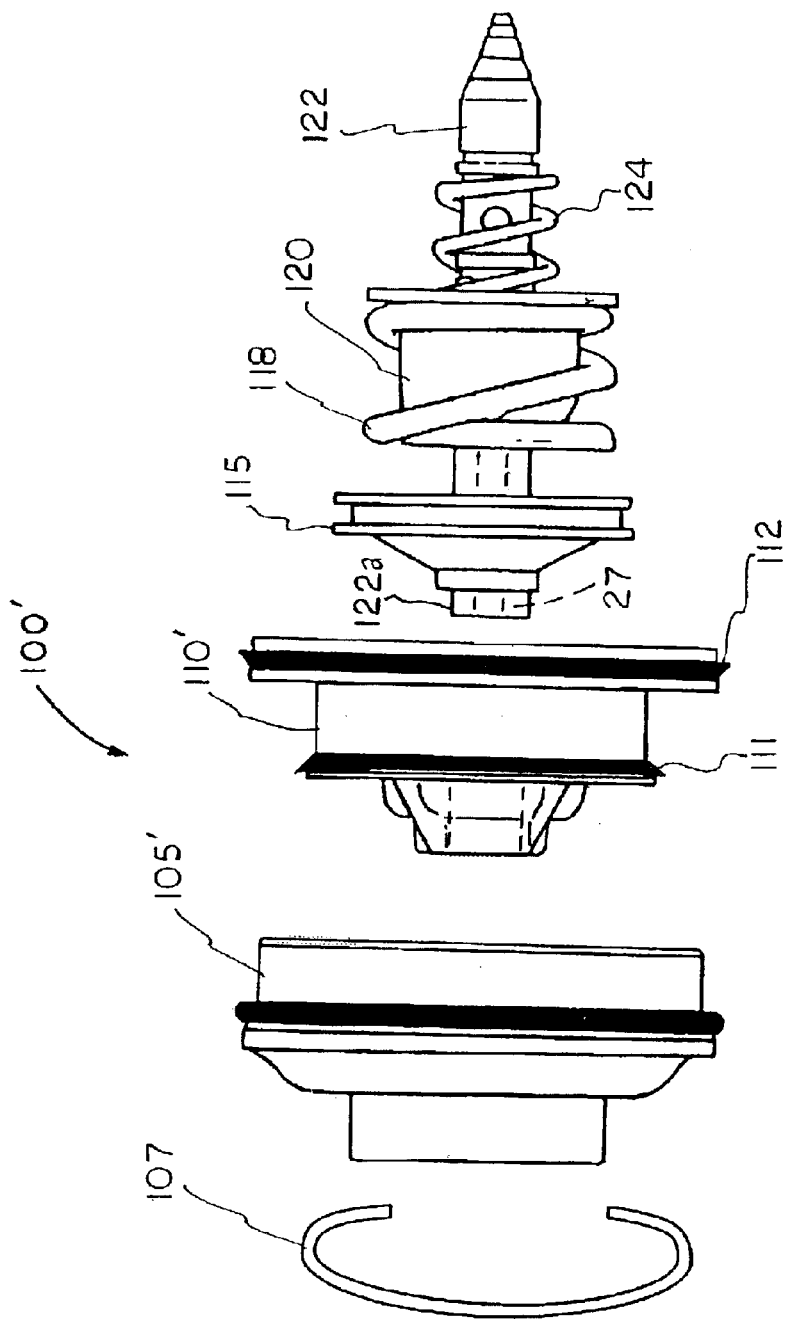
FIG. 3 is an exploded elevational view of the intermediate servo including components of an aftermarket kit labeled Prior Art.

It is known in the prior art to adapt the OEM intermediate servo 100 for high performance applications by providing an aftermarket intermediate servo kit. A commercially available kit of the type marketed by Shift Technology Products, a division of Superior Transmission Parts, Inc., Tallahassee, Fla., has been designed for this purpose. As shown in FIG. 3 this kit produces a modified intermediate servo 100' including a servo cover 105' and a servo piston 110', which are machined oversize to provide additional fluid volume. New lip seals 111, 112 of the same type are also provided.

For the high performance application, the user of this kit is instructed by the manufacturer to remove the Teflon seal 117 from the accumulator piston 115 to disable its function. All of the remaining OEM components except for spring 118 (i.e. accumulator piston 115, clip 119, spring retainer 120, apply pin 122, and cushion spring 124) are effectively used as spacers during reassembly. However, reassembly of the modified intermediate servo 100' in such manner with the spring 118 omitted creates mismatched part surfaces and the potential for noise, abnormal wear, and inaccurate operation.

Figure 4:
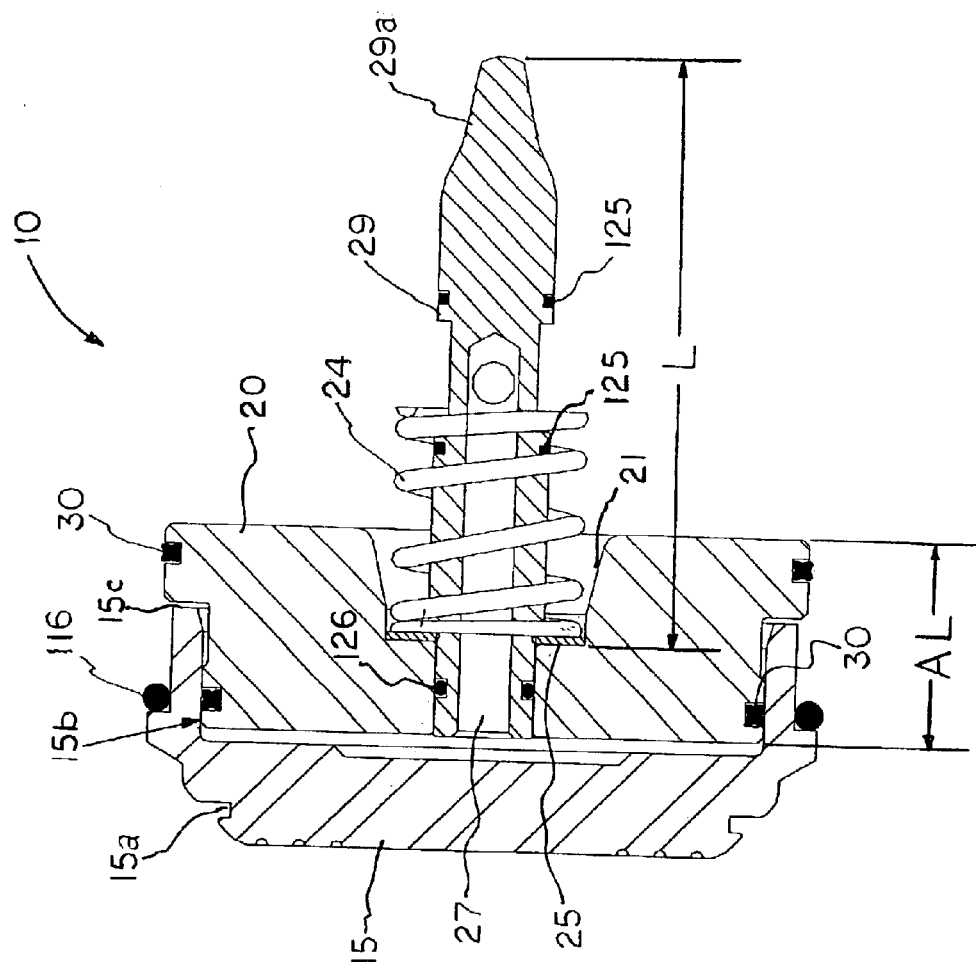
FIG. 4 is a cross-sectional view of the intermediate servo of the present invention in the release position.

Accordingly, the present high performance, intermediate servo assembly has been developed to resolve these problems and will now be described. With reference to FIG. 4 there is shown therein an intermediate servo assembly in accordance with the present invention, indicated generally at 10. The present intermediate servo assembly 10 is comprised of a modified servo cover 15, a modified servo piston 20, and a modified pin 29, which are configured as shown. The present servo assembly 10 utilizes a heavier gauge return spring 24 having a spring rate in the range of 150 to 155 pounds, which differs significantly from the OEM cushion spring 124. The return spring 24 is seated on at least one washer or spacer 25 as shown.

The modified pin 29 is provided with seals 125 and seal 126 at locations designed to prevent leakage of the increased hydraulic pressure generated by the servo piston 20 from the piston chamber 50. The modified pin 29 is also provided with structures comprising length-adjusting means including, but not limited to, the following structures. In the present design the thickness and/or number of spacers 25 may be varied to adjust the effective overall length "L" of the pin 29 and the operating characteristics of the band 130. Thus, the band 130 can be brought into closer proximity with the clutch drum (not shown) by increasing length "L" thereby reducing the actuating stroke and time required to apply the clutch.

In addition, the length-adjusting means further include a plurality of tapered segments 28 delineated by circumferential undercut markings 29a' formed in the tip 29a of the pin 29. Utilizing a method of the present invention the distal segment 28 of pin 29 is removed by machining (e.g. grinding) to shorten the overall length of pin 29. Thus, the application of the clutch can also be adjusted by shortening of the tip 29a to increase the actuating stroke and/or delay the time required to apply the clutch.

Of course, such length adjustments and the resultant clutch performance can be fine tuned by varying the thickness and/or number of spacers 25 as described hereinabove in combination with grinding the tip 29a of the pin 29 to provide optimal shift performance.

In the preferred embodiment the modified servo cover 15 and servo piston 20 are fabricated from aluminum bar stock, castings, or extruded stock. The inside diameter (I.D.) of the piston bore 15b has been substantially increased over the OEM and aftermarket designs to generate an increase in fluid capacity and, thus, an increase in holding power of the band 130 and the direct clutch.

As shown in FIG. 4 the servo cover 15 is provided with a tool groove 15a, which facilitates removal of the cover 15 from the transmission case 135 for service/overhaul purposes. The servo cover 15 is provided with an O-ring seal 116 substantially the same as the OEM version for sealing within the mating bore 150 (FIG. 2) of the transmission case 135.

Still referring to FIG. 4 the axial length "AL" of the servo piston 20 has been increased to correspond to the sum total of the assembled stack-up dimension of the OEM piston 110, the accumulator piston 115, accumulator spring 118, and spring retainer 120 while integrating the critical working surfaces thereof. More particularly, the spring retainer 120, which functions as a seat for spring 124 in the OEM design is effectively built into the present piston 20 as at tapered counterbore 21. Thus, it will be understood that all of the aforementioned OEM components are unnecessary in the present design and may be discarded when the intermediate servo assembly 10 is retrofitted to the GM transmissions.

Further, it can be seen in FIG. 4 that lip seals 111, 112 have been replaced by a seal having a multi-lobed configuration known as a quad-lobed seal 30. Quad lobed seals are very reliable because they have twice the sealing surfaces as standard round O-rings. In the present invention the quad-lobed seals 30 are preferably made from fluorocarbon material (i.e. PTFE), which provides improved heat resistance. Thus, the present intermediate servo 10 is capable of generating and maintaining increased hydraulic fluid pressure and holding power to the direct clutch.

In order to install the present intermediate servo assembly 10, the OEM intermediate servo is removed from the transmission case and discarded. Next, a modified apply pin 29 having a shortened axial length is fitted with new seals 125, at least one washer 25 is mounted in position, and the apply pin 29 is pressed into the servo piston 20 as shown in FIG. 4. Next, the quad-lobed seals 30 are installed in the appropriate grooves 32 formed in the outside diameters (O.D.) of the servo piston 20 with a suitable lubricant and the piston 20 is engaged in the piston bore 15b of the piston cover 15 as shown. Thereafter, the return spring 24 is placed in position and the servo assembly 10 is installed in the mating bore 150 (FIG. 2) of the transmission case 135 such that the tapered tip 29a of the apply pin 29 engages a receptacle 123 on the moveable end 130b of band 130.

Figure 5:
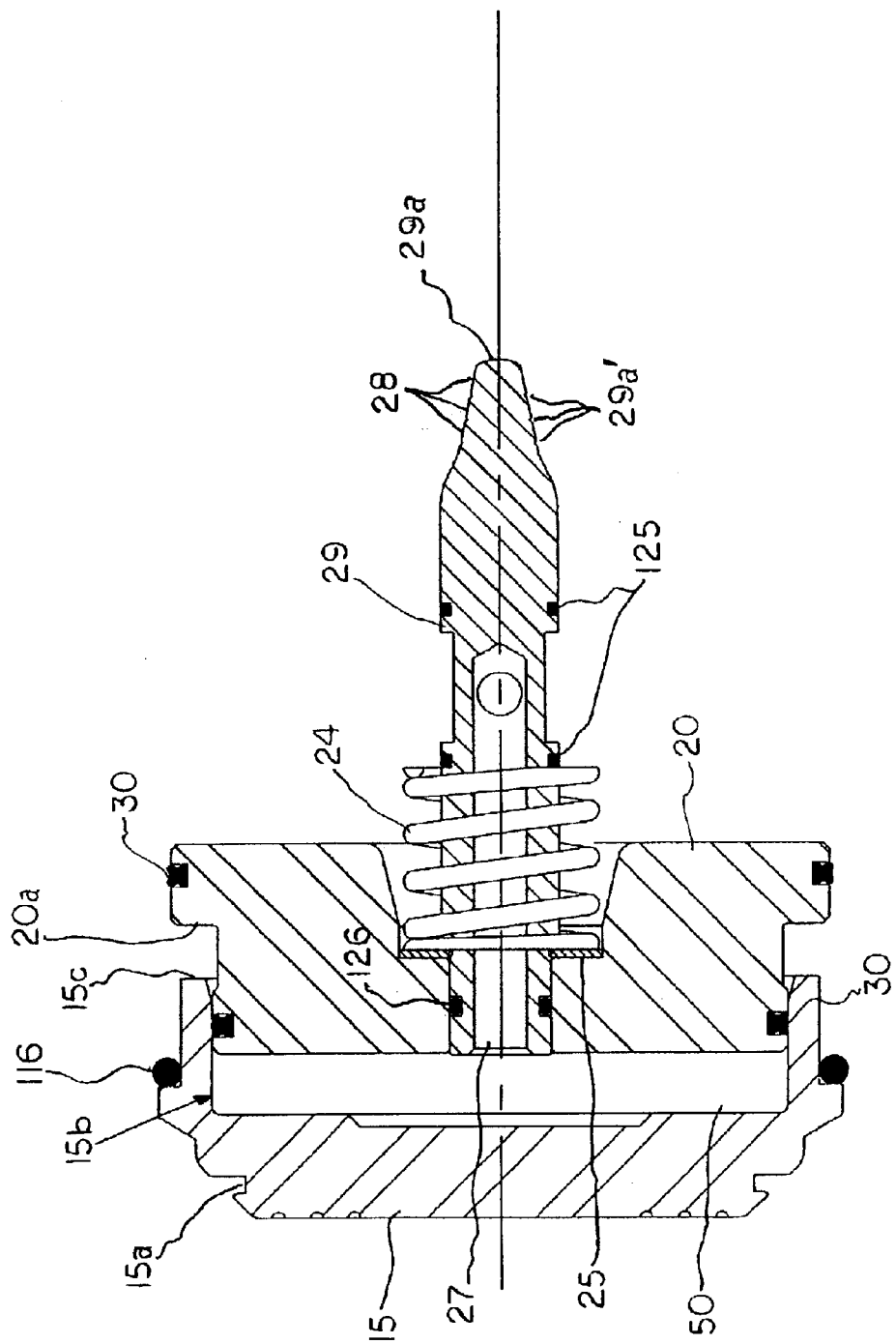
FIG. 5 is a cross-sectional view of the intermediate servo of the present invention in the apply position.

In operation $2^{nd}$ gear clutch fluid pressure is delivered to the piston chamber 50 via oil passage 27 in the apply pin 29 and acts on the apply side of piston 20 as shown in FIG. 5. As the piston chamber 50 is filled with fluid under pressure, the piston 20 is stroked (i.e. to the right in FIG. 5) against the force of spring 24. Actuation of the servo piston 10 forces the apply pin 29 into the band 130, which compresses around the direct clutch drum to prevent it from turning to obtain $2^{nd}$ gear. When clutch fluid pressure is released, the servo piston 20 returns to the position shown in FIG. 4 and the clutch is released.

It will be noted that the return stroke of the present servo piston 20 is stopped by contact with the end face of cover 15c against a shoulder 20a formed about the circumference of piston 20 (FIG. 5). This represents an improvement in operating control over the prior art design wherein the proximal end 122a of pin 122 bottoms out on the inside of cover 105' to halt the return stroke of the piston 110'. The present design also permits the combined axial length of the servo piston 20 and cover 15 to be decreased significantly, which uses less material and reduces manufacturing costs.

Thus, it can be seen that the present invention provides a high performance intermediate servo assembly for use with GM transmissions that produces at least a 17% increase in surface apply area of the servo piston and a corresponding increase in hydraulic fluid delivered to the $2^{nd}$ gear clutch band, which it actuates to obtain $2^{nd}$ gear. The present intermediate servo assembly reduces the number of component parts required and improves the performance of the intermediate servo in comparison to aftermarket replacement kits.

Although not specifically illustrated in the drawings, it should be understood that additional equipment and structural components will be provided as necessary and that all of the components described above are arranged and supported in an appropriate fashion to form a complete and operative high performance intermediate servo incorporating features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

What is claimed is:

1. A high performance intermediate servo assembly for replacing an original equipment intermediate servo assembly within an automatic transmission, wherein said original equipment intermediate servo assembly includes a piston cover, a servo piston, an accumulator, an accumulator spring, a spring retainer, an apply pin, and a cushion spring assembled coaxially for actuating a $2^{nd}$ gear clutch within said transmission, said high performance intermediate servo assembly comprising:

a high performance servo piston cover having an oversize piston bore in comparison to said original equipment piston cover;

a high performance servo piston for mating engagement within said oversize piston bore, said servo piston having an overall length equivalent to an assembled stack-up dimension of said original equipment servo piston, accumulator, accumulator spring, and spring retainer components and also integrating critical working surfaces thereof to retain proper function; and a modified apply pin for insertion in a mating bore formed along a longitudinal axis of said servo piston, wherein said apply pin includes length adjusting means for varying the effective axial length thereof.

2. The high performance intermediate servo assembly of claim 1 wherein said oversize piston bore generates at least a 17% increase in surface apply area and a corresponding increase in hydraulic fluid pressure delivered to said $2^{nd}$ gear clutch in comparison to said original equipment servo piston.

3. The high performance intermediate servo assembly of claim 1 wherein said length adjusting means includes at least one spacer of predetermined thickness for placement intermediate said servo piston and said apply pin to effectively lengthen said apply pin thereby reducing the actuating stroke of said servo piston.

4. The high performance intermediate servo assembly of claim 3 wherein said length adjusting means further includes a plurality of tapered segments formed at the distal tip of said apply pin, wherein said tapered segments are removed by machining to shorten the axial length of said apply pin.

5. The high performance intermediate servo assembly of claim 4 wherein said tapered segments are delineated by undercut markings at regular axial intervals.

6. The high performance intermediate servo assembly of claim 2 wherein said servo piston is provided with at least one quad-lobed seal disposed in a circumferential groove formed in said servo piston for sealing engagement with said servo piston cover to ensure the hydraulic integrity thereof.

7. An improved automatic transmission including a transmission case wherein an original equipment intermediate servo assembly for actuating a $2^{nd}$ gear clutch is replaced by a high performance intermediate servo assembly, wherein said original equipment intermediate servo assembly includes a piston cover, a servo piston, an accumulator, an accumulator spring, a spring retainer, an apply pin, and a cushion spring assembled coaxially within a mating bore in the transmission case, wherein the improvement comprises:

a high performance servo piston cover having an oversize piston bore in comparison to said original equipment piston cover;

a high performance servo piston for mating engagement within said oversize piston bore, said servo piston having an overall length equivalent to an assembled stack-up dimension of said original equipment servo piston, accumulator, accumulator spring, and spring retainer components and also integrating critical working surfaces thereof to retain proper function; and a modified apply pin for insertion in a mating bore formed along a longitudinal axis of said servo piston, wherein said apply pin includes length adjusting means for adjusting the effective axial length thereof.

8. An improved automatic transmission of claim 7 wherein said oversize piston bore generates at least a 17% increase in surface apply area and a corresponding increase in hydraulic fluid pressure delivered to said $2^{nd}$ gear clutch in comparison to said original equipment servo piston.

9. An improved automatic transmission of claim 7 wherein said length adjusting means includes at least one spacer of a predetermined thickness for placement intermediate said servo piston and said apply pin to effectively lengthen said apply pin thereby reducing the actuating stroke of said servo piston.

10. An improved automatic transmission of claim 9 wherein said length adjusting means further includes a plurality of tapered segments formed at a distal tip of said apply pin, wherein said tapered segments are removed by machining to shorten the axial length of said apply pin.

11. An improved automatic transmission of claim 10 wherein said tapered segments are delineated by undercut markings at regular axial intervals.

12. An improved automatic transmission of claim 8 wherein said servo piston is provided with at least one quad-lobed seal disposed in a circumferential groove formed in said servo piston for sealing engagement with said servo piston cover to ensure the hydraulic integrity thereof.

* * * * *